Aug. 4, 1970    H. M. REDDICK, SR., ET AL    3,522,851
PLOW STRUCTURES
Filed Feb. 14, 1968      2 Sheets-Sheet 2
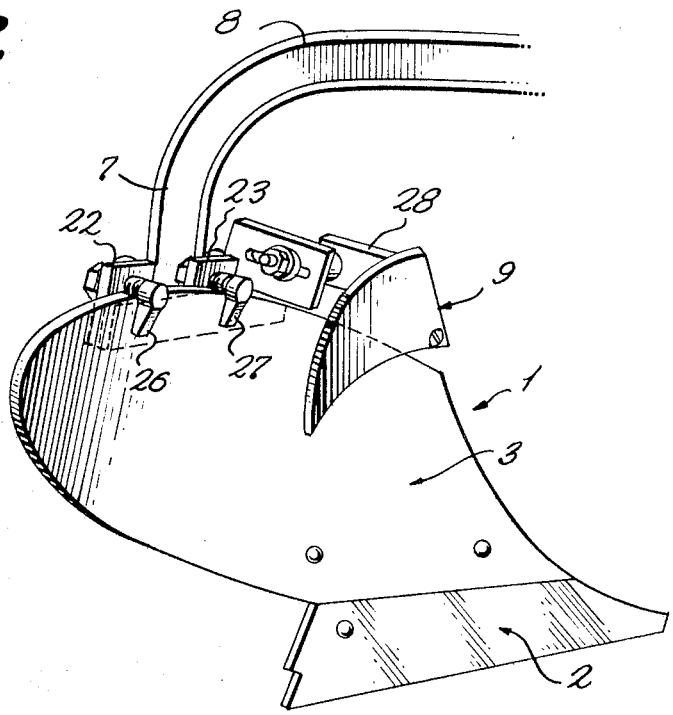
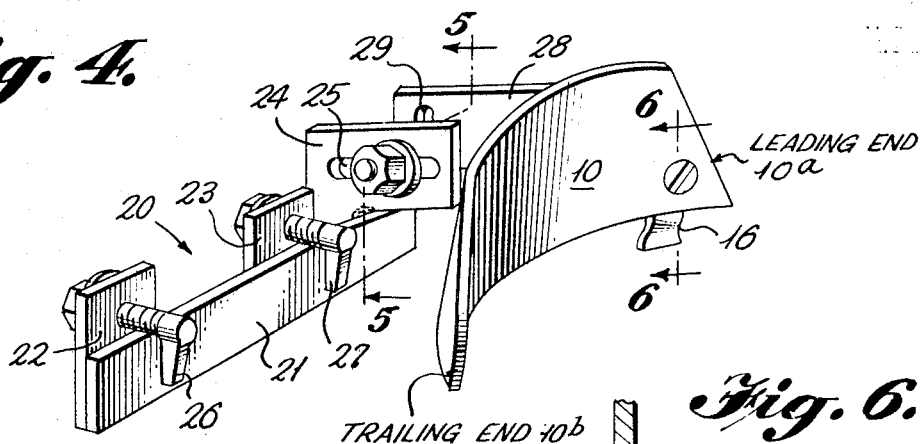
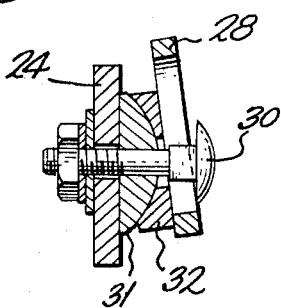
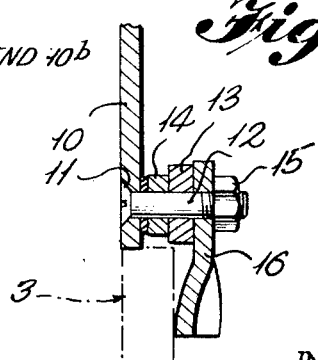
INVENTORS
Haul M. Reddick, Sr. &
Haul M. Reddick, Jr.
BY Carl T. Mack
ATTORNEY

United States Patent Office 3,522,851
Patented Aug. 4, 1970

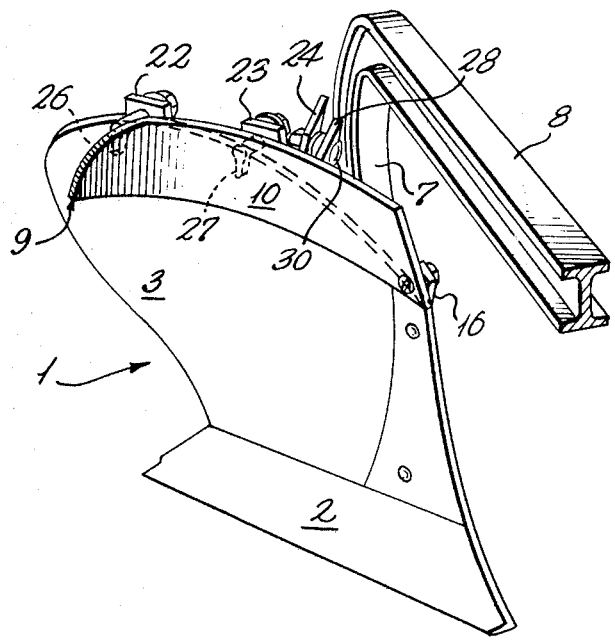

---

3,522,851
PLOW STRUCTURES
Haul M. Reddick, Sr., 614 W. Main St., and Haul M. Reddick, Jr., 112 Edgelea St., both of Williamston, N.C. 27892
Filed Feb. 14, 1968, Ser. No. 705,461
Int. Cl. A01b *15/10*
U.S. Cl. 172—736
4 Claims

ABSTRACT OF THE DISCLOSURE

A trash cover for use in combination with a plow which is completely adjustable to fit all plows and plowing conditions. The trash cover is adapted to be mounted on any plow having a curved moldboard.

The trash cover is mounted on and supported by any plow that has a curved moldboard. A bracket is secured to the plow moldboard by lug bolts and the bracket may be moved laterally on the moldboard until the leading edge of the trash cover moldboard is correctly positioned. The trash cover moldboard is mounted to the bracket by means of a carriage bolt said bolt passing between the bracket and the trash cover moldboard and through two washers, one of which is flat on one side and concave on the other side; the other washer being flat on one side and convex on the other. When fitted together, the washers form a ball and socket arrangement which will automatically take up any misalignment between the bracket mounted on the plow moldboard and the bracket mounted on the trash cover moldboard. The plow beam does not function to support the trash cover.

---

This invention relates to farm implements and more particularly to an attachment for use in conjunction with a plowshare for the purpose of enabling cover crops, trash and litter on a field to be turned underground as the field is plowed.

A field to be plowed quite often contains a cover crop or quite an accumulation of trash in the form of leaves, sticks, stones, stubble and stalks of previously harvested crops on its upper surface. In the event that this material is permitted to remain on the surface of the field it may interfere with the planting and cultivation of subsequent crops. Prior to this invention it has been proposed to equip a plow with an attachment which will engage and deflect such material in a manner to insure its being turned underground.

Various attachments have been proposed from time to time to drive such stubble or trash into the furrow being filled so that it will be substantially buried therein. Such attachments have taken three forms. The first form has been a wing device mounted above the moldboard which acted as an extension of the primary moldboard, thereby completing the circle commenced by the primary moldboard. The disadvantage attaching to such a device is that it is not adjustable and works at one depth. If the depth of the plow varies, as it does in any field, a ragged plowing job is obtained. A further disadvantage is that no satisfactory universal bracket has been found that will fit all plows.

The second form of attachment is a second moldboard somewhat in front of and lower than the primary moldboard. Due to the fact that these devices are fixed at one point no field adjustments are possible, hence they work at only one plowing depth and one soil condition. Apparently no universal bracket has been developed.

A third form of attachment has been a second moldboard which turns the trash upside-down on the unbroken soil. The primary moldboard then turns over this trash material.

On object of this invention is to provide a simple attachment that promotes substantially complete coverage of stalks and trash from previous crops.

Another object of the invention is to provide a universal bracket which will fit all plows.

Another object of the invention is to provide an attachment which is completely adjustable to fit all plowing depths, all soil conditions, and all trash conditions.

Other objects and advantages of the invention will be referred to specifically or will become apparent from the following description when it is considered in conjunction with the appended claims and the accompanying drawings, in which:

FIG. 1 is a fragmentary, front perspective view illustrating a plow equipped with an attachment constructed in accordance with the invention;

FIG. 2 is a rear perspective view similar to FIG. 1;

FIG. 3 is a side elevational view of the plow and the attachment of this invention and showing the mounting means for the attachment;

FIG. 4 is a perspective view of the attachment showing in detail the mounting means therefor;

FIG. 5 is a view, in cross section, of the ball and socket arrangement;

FIG. 6 is a view in cross section of a clip which is adapted to be hooked over the edge of the moldboard.

The apparatus which is constructed according to the invention is designed for use in conjunction with a conventional plow 1 having a plow share 2 which is mounted on a concave moldboard 3 in a manner well known in the art. The plow is equipped with a conventional landslide 4 secured to the moldboard 3 by a bracing member 5. The plowshare must be mounted to the plowbeam so a bracket 6 is employed, suitably secured to the landslide 4 and to the portion 7 of the plowbeam 8.

The trash cover constructed in accordance with this invention is indicated in a general way by reference character 9 and is adapted to be mounted on any plow having a curved moldboard. The trash cover comprises an arcuate plate member 10 adapted to be mounted, as shown in FIG. 2, above the upper edge of the moldboard 3. The arcuate plate at its ends has a leading end 10a and a trailing end 10b. This arcuate plate should more properly be termed the trash cover moldboard to distinguish it from the plow moldboard.

At the leading edge of the trash cover moldboard there is provided a hole 11 countersunk on the front face of the trash cover moldboard. This is plainly seen in FIG. 6 which is a cross section taken on line 6—6 of FIG. 4. A head bolt 12 passes through hole 11, the head of the bolt fitting into the countersunk hole 11 and presenting a smooth connection at this point. The head bolt supports a block member 13 and a square nut 14 and on the threaded end of the bolt there is mounted a nut 15. Sandwished between the nut 15 and the square nut 14 there is a clip member 16 having a slight bend in its formation. The purpose of this clip is to provide a means to be hooked over the edge of the plow moldboard in the region of the leading edge 10a thereof. Some plow moldboards are thicker than others at this point so block member 13 is provided to take care of any such variations. Should block member 13 be not needed it is removed from the position it holds between members 14 and 16 and transferred to a position (not shown) between the clip 16 and the nut 15 where it will serve as a mere washer to take up bolt threads.

The curvature of the plate member 10 is concave forwardly as may be seen best in FIG. 1, so that the trailing end 10b will be located forwardly of the trailing end of the plow moldboard when the plate member or trash cover moldboard 10 is placed on the plow. In order to enable the attachment 9 to function under all conceived conditions, it is preferred that the trash cover moldboard be mounted for substantially universal adjustment relative to the plow.

FIGS. 2 and 4 best show the adjustable mounting means for the trash cover moldboard, which taken as a whole is denoted by reference character 20, FIG. 4. The bracket 21 is shaped as shown in FIG. 4 and this bracket is provided with two spaced upstanding lug supporting members 22 and 23 preferably welded to the bracket 21. A third vertically disposed bracket 24 is secured preferably by welding, to bracket 21, assuming an angle of substantially 45° thereto. Bracket 24 is provided with a horizontal slot 25. Hence, a unitary bracket structure comprising lug supporting members, a supporting member for these and for a third bracket is provided. As shown in FIG. 4, lug bolts 26 and 27, each individual to its respective bracket, and supported therein by securing washers and nuts, are provided. Bracket 21 is secured to plow moldboard 3 by the lug bolts after moving it laterally on the moldboard until the leading edge of the trash cover moldboard is correctly positioned, but for the moment, the lug bolts are not fully tightened.

The trash cover moldboard is provided on its rear surface with a fourth vertically disposed bracket 28 having therein a vertically disposed slot 29 and through slots 25 and 29 a carriage bolt 30 (FIG. 5) passes, provided with a securing nut, a lock washer and a standard washer as noted. Between bracket 28 and bracket 24 and surrounding the carriage bolt 30 are two washers 31 and 32. One of these washers, 31, is flat on one side where it rests against bracket 24, and convex on the other side. The other washer, 32, is flat on one side where it rests against bracket 28 and concave on the other side. These washers are designed to fit together, thereby forming a ball and socket arrangement sandwiched between brackets 24 and 28.

In operation, bracket 21 is mounted on the top edge of the plow moldboard as previously set forth. The trash cover moldboard is secured to the bracket 21 by means of the carriage bolt 30 and this bolt is but partially tightened, keeping in mind the ball and socket arrangement. The clip 16 is hooked or placed over the edge of the plow moldboard and, since some plow moldboards are thicker than others at this point, the arrangement pertaining to FIG. 6 and previously outlined is employed.

Lug bolts 26 and 27 are now tightened. The trash cover moldboard is adjusted and then the carriage bolt 30 is tightened, whereupon the ball and socket arrangement is readied to automatically take up misalignment between bracket 21 and the trash cover moldboard 10.

Further, in operation, the trash cover moldboard is taken into the field and there adjusted to field conditions. It may be adjusted upwardly or downwardly or tilted forwardly or backwardly by means of the two slots 25 and 29 and the trailing end 10b of the trash cover moldboard can be caused to repose at a greater or lesser distance from the plow moldboard by the ball and socket arrangement which compensates for misalignment between bracket 21 and trash cover moldboard 10. In other words, the trash cover moldboard can be adjusted by making use of one bolt, 30, to meet changing plow conditions such as: depth of the plow or changes in the top layer of trashy soil.

Therefore, the object of the invention which is to cut off the top portion of trashy soil and deposit it in the previously opened furrow, later to be covered by a sheet of clean soil coming off the plow moldboard, has been achieved. As a second object of the invention, there has been provided a trash cover completely adjustable to fit all plows and plowing conditions.

The invention is defined in the claims.

What is claimed is:

1. An attachment for a plowshare having a curved plow moldboard, said plow moldboard embodying a leading end and a trailing end, said attachment having means for detachably mounting the same exclusively on the upper marginal edge of said plow moldboard and deriving its support therefrom, said attachment comprising a first bracket having a leading end and being adapted for location adjacent to the leading end of said plow moldboard and a trailing end adapted for location adjacent to the trailing end of said plow moldboard, a pair of second bracket members spaced from each other but rigidly attached to said first bracket, each of said second bracket members having lug bolts therein for detachably mounting said attachment upon the upper marginal edge of said plow moldboard, a third vertically and angularly disposed bracket rigidly attached to said first bracket closely adjacent to the leading end of said first bracket and provided with a horizontally disposed bolt slot, a trash cover moldboard presenting an arcuate rear surface to said plow moldboard and having rigidly secured thereto a fourth bracket provided with a vertically disposed bolt slot, said fourth bracket being supported by said third bracket by a bolt passing through said bolt slots and through a ball and socket structure disposed between said fourth and third brackets.

2. The attachment set forth in claim 1 wherein said ball and socket structure comprises a pair of engaging washers, one of said washers being flat on one side where it rests against said third bracket and convex on its other side, the other of said washers being flat on one side where it rests against said fourth bracket and concave on its other side, said washers being adapted to engage each other in a ball socket fashion when said bolt passing through said bolt slots is tightened.

3. The combination with a plowshare having a curved plow moldboard said plow moldboard embodying a leading end and a trailing end, of an attachment for use with said plow moldboard in turning trash under soil as said plowshare is drawn through a field, said attachment having means for detachably mounting the same exclusively on the upper marginal edge of said plow moldboard and deriving its support therefrom, said attachment comprising a first bracket having a leading end and being adapted for location adjacent to the leading end of said plow moldboard and a trailing end adapted for location adjacent to the trailing end of said plow moldboard, a pair of second bracket members spaced from each other but rigidly attached to said first bracket, each of said second bracket members having lug bolts therein for detachably mounting said attachment upon the upper marginal edge of said plow moldboard, a third vertically and angularly disposed bracket rigidly attached to said first bracket closely adjacent to the leading end of said first bracket and provided with a horizontally disposed bolt slot, a trash cover moldboard presenting an arcuate rear surface to said plow moldboard and having rigidly secured thereto a fourth bracket provided with a vertically disposed bolt slot, said fourth bracket being supported by said third bracket by a bolt passing through said bolt slots and through a ball and socket structure disposed between said fourth and third brackets for universally adjustably mounting said trash cover moldboard on said plow moldboard.

4. The combination set forth in claim 3 wherein said adpustable means is adjustable in a plurality of planes so as to enable substantially universal adjustment of said trash cover moldboard with respect to said plow moldboard.

References Cited

UNITED STATES PATENTS

| | | | |
|---|---|---|---|
| 292,795 | 2/1884 | Dickison | 172—734 X |
| 2,915,131 | 12/1959 | Yetter | 172—736 |
| 2,950,771 | 7/1960 | Yetter | 172—736 |
| 3,036,643 | 5/1962 | Duncanson | 172—736 |
| 3,147,812 | 9/1964 | Duncanson | 172—736 |

ROBERT E. PULFREY, Primary Examiner

J. W. PETERSON, Assistant Examiner

U.S. Cl. X.R.

172—759